United States Patent
Arimilli et al.

[11] Patent Number: 5,909,561
[45] Date of Patent: Jun. 1, 1999

[54] APPARATUS AND METHOD FOR SEPARATELY LAYERING CACHE AND ARCHITECTURAL SPECIFIC FUNCTIONS IN DIFFERENT OPERATIONAL CONTROLLERS TO FACILITATE DESIGN EXTENSION

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/839,443

[22] Filed: Apr. 14, 1997

[51] Int. Cl.⁶ ................................................... G06F 13/00
[52] U.S. Cl. ........................................ 395/309; 711/118
[58] Field of Search ................................ 395/284, 800.01, 395/853, 856, 860, 309; 711/118, 129, 130, 140, 153, 154, 169, 170

[56] References Cited

U.S. PATENT DOCUMENTS

| | | | |
|---|---|---|---|
| 4,901,230 | 2/1990 | Chen et al. | 711/149 |
| 4,926,363 | 5/1990 | Nix | 702/120 |
| 5,175,829 | 12/1992 | Stumpf et al. | 395/379 |
| 5,235,688 | 8/1993 | Taniguchi et al. | 395/425 |
| 5,276,852 | 1/1994 | Callander et al. | 395/309 |
| 5,276,902 | 1/1994 | Nakatani et al. | 395/800.06 |
| 5,408,627 | 4/1995 | Stirk et al. | 711/151 |
| 5,544,345 | 8/1996 | Carpenter et al. | 395/477 |
| 5,553,263 | 9/1996 | Kalish et al. | 711/127 |
| 5,598,550 | 1/1997 | Shen et al. | 711/146 |
| 5,644,753 | 7/1997 | Ebrahim et al. | 711/131 |
| 5,710,905 | 1/1998 | Wan | 711/118 |
| 5,732,408 | 3/1998 | Takahashi | 711/113 |
| 5,748,985 | 5/1998 | Kanai | 711/130 |
| 5,751,983 | 5/1998 | Abramson et al. | 395/392 |

FOREIGN PATENT DOCUMENTS 0 301 921 A2  2/1989  European Pat. Off. ........ G06F 13/18

*Primary Examiner*—Ayaz R. Sheikh
*Assistant Examiner*—Xuan M. Thai
*Attorney, Agent, or Firm*—Richard A. Henkler; Daniel E. Venglarik; Andrew J. Dillon

[57] ABSTRACT

Cache and architectural functions within a cache controller are layered and provided with generic interfaces, isolating controller logic from specific architectural complexities. Controller logic may thus be readily duplicated to extend a nonshared cache controller design to a shared cache controller design, with only straightforward modifications required. Throttling of processor-initiated operations handled by the same controller logic resolves operation flow rate issues with acceptable performance trade-offs.

21 Claims, 6 Drawing Sheets

APPARATUS AND METHOD FOR SEPARATELY LAYERING CACHE AND ARCHITECTURAL SPECIFIC FUNCTIONS IN DIFFERENT OPERATIONAL CONTROLLERS TO FACILITATE DESIGN EXTENSION

RELATED APPLICATIONS

The present invention is related to the subject matter of the following commonly assigned copending United States patent applications, each filed Apr. 14, 1997: Ser. No. 08/839,442, now pending, (Docket No. AT9-97-292) entitled "Method of Layering Cache and Architectural Specific Functions"; Ser. No. 08/834,115, now pending (Docket No. AT9-97-293) entitled "Method of Layering Cache and Architectural Specific Functions to Expedite Multiple Designs"; Ser. No. 08/834,114, now pending, (Docket No. AT9-97-294) entitled "Method of Layering Cache and Architectural Specific Functions for Splitting Operations"; Ser. No. 08/839,445, now pending, (Docket No. AT9-97-193) entitled "Method of Layering Cache and Architectural Specific Functions to Permit Generic Interface Definition"; and Ser. No. 08/839,441, now pending, (Docket No. AT9-97-195) entitled "Method of Layering Cache and Architectural Specific Functions to Promote of Operation Symmetry." The content of the above-mentioned copending applications is incorporated herein by reference.

BACKGROUND OF THE INVENTION

1. Technical Field

The present invention relates in general to cache controllers in data processing systems and in particular to cache controllers which layer cache and architectural specific functions. Still more particularly, the present invention relates to supporting straightforward extension of nonshared cache controller implementations to shared implementations, with simple resolution of associated flow rate issues.

2. Description of the Related Art

Data processing systems which utilize a level two (L2) cache typically include a cache controller for managing transactions affecting the cache. Such cache controllers are conventionally implemented on a functional level, as depicted in FIG. 7. For example, a cache controller 702 may include logic 704 for maintaining the cache directory, logic 706 for implementing a least recently used (LRU) replacement policy, logic for managing reload buffers 708, and logic for managing store-back buffers 710. In traditional implementations, the cache is generally very visible to these and other architectural functions typically required for cache controllers, with the result that cache controller designs are specific to a particular processors such as the PowerPC™, Alpha™, or the x86 family of processors.

The basic controller structure depicted in FIG. 7 is employed in both nonshared and shared cache controller designs. Nonshared cache controllers manages transactions between a single upstream processor and a nonshared cache. Shared cache controllers, which manage transactions to a cache shared by two or more processors, are difficult to design but have been successfully implemented. Because of the extensive interlocks required, controller designs for a single upstream processor are virtually useless when designing a controller for a shared cache. The logic required for nonshared cache controllers is already complex for many processors and bus architectures because of the numerous special cases which must be accommodated. The logic complexity increases exponentially as additional upstream processors are added and additional interlock logic for coordination becomes necessary. In particular, a substantial portion of the complexity in a shared cache design derives from the requirement—unique to shared cache designs—that the cache controller be capable of responding to a plurality of operations initiated by different processors in the same cycle. For a nonshared cache, only one operation may be initiated within a given cycle. Under the prior art approach, nonshared cache controller designs may not be easily reused in shared cache controllers, but require extensive and laborious design modifications and enhancements for successful transition to a shared controller design.

An additional problem with prior art designs relates to operation flow rate. Typically operations are initiated at a certain rate. In traditional implementations, operations initiated by an upstream processor or processors generally cannot be cancelled or ignored by the cache controller. The cache controller must respond to the operation, even if only to indicate that the operation should be retried later. Therefore, cache controllers are designed to respond to operations at the rate at which they are initiated by an upstream processor or processors. Thus, if a controller supports a single upstream processor which initiates operations at a given flow rate, cache controller 702 must respond to operations at that flow rate. For example, where a bus is defined to be capable of producing an operation once every three cycles, the cache controller is also designed to respond to operations at a rate of one every three cycles. Similarly, shared cache controllers are designed to respond to operations at a cumulative flow rate for upstream processors (that is, equal to the flow rate of all operations initiated by processors sharing the subject cache). Such operational speed requirements, imposed on necessarily complex logic, present a substantial design obstacle.

It would be desirable, therefore, to implement a cache controller which permits straightforward extension of a nonshared controller design to a shared design. It would further be advantageous to provide a cache controller design permitting uncomplicated resolution of the operation flow rate issues associated with implementing a shared cache controller.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to provide a cache controller design supporting straightforward extension of nonshared cache controller implementations to shared implementations, with simple resolution of associated flow rate issues.

The foregoing objects are achieved as is now described. Cache and architectural functions within a cache controller are layered and provided with generic interfaces, isolating controller logic from specific architectural complexities. Controller logic may thus be readily duplicated to extend a nonshared cache controller design to a shared cache controller design, with only straightforward modifications required. Throttling of processor-initiated operations handled by the same controller logic resolves operation flow rate issues with acceptable performance trade-offs.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
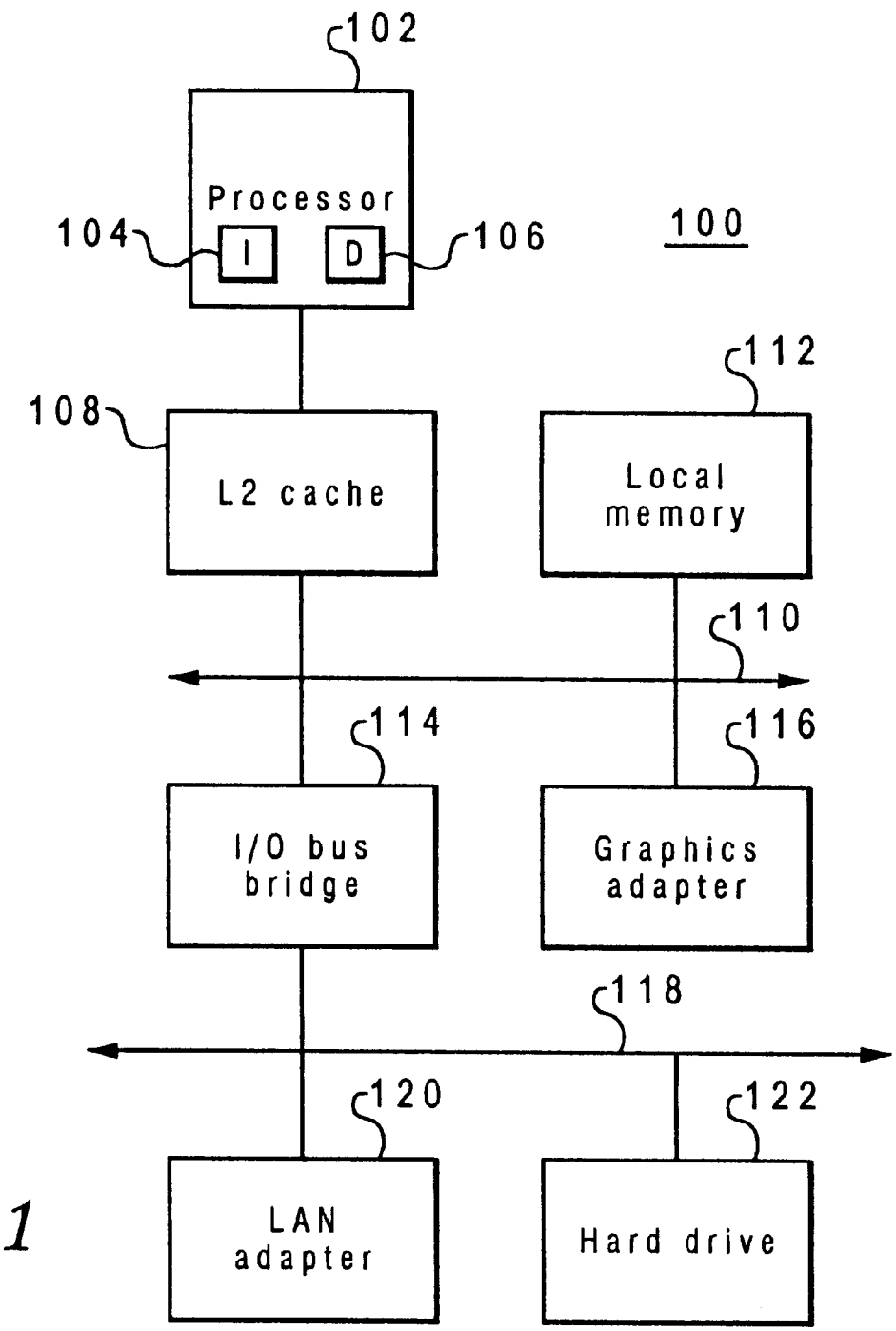
FIG. 1 depicts a data processing system implemented with a nonshared cache controller design in accordance with a preferred embodiment of the present invention.

With reference now to the figures, and in particular with reference to FIG. 1, a data processing system implemented with a nonshared cache controller design in accordance with a preferred embodiment of the present invention is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a level two (L2) cache 108, which is a nonshared cache. A second processor (not shown) may be added to the system depicted, provided a separate L2 cache, if any, is utilized by the second processor. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, a data processing system need not be limited to a single processor as shown in the depicted example to benefit from the present invention. The present invention may be employed, for example, to improve the performance of a data processing system having two processors, each with a corresponding L2 cache.

Figure 2:
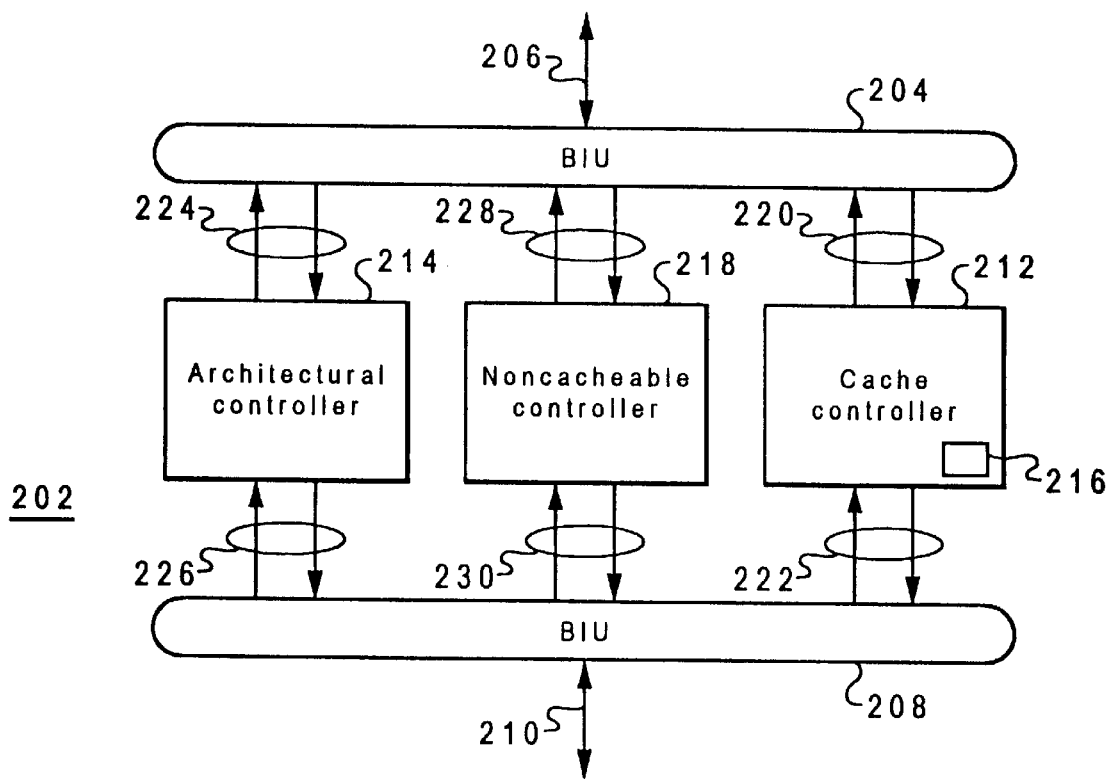
FIG. 2 is a block diagram of a nonshared cache controller design in accordance with a preferred embodiment of the present invention.

Referring to FIG. 2, a block diagram of a nonshared cache controller design in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may be a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Remaining operations are defined as architectural operations. Unlike cache operations, architectural operations generally do not change the value of data in a memory location. An architectural operation may move the data to a different location within the cache hierarchy, change the status of data in a particular memory location, or perform other such functions. However, architectural operations generally do not directly alter the value of data within a memory location.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest. Processor-side architectural operations pass through architectural controller 214 to system bus 210 and affects cache controller 212 as apparent system-side architectural operations.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. Bus interface units 204 and 208 are responsible for managing transactions and protocols to bus 206 and system bus 210, translating the specific bus transactions into the protocol for generic interfaces 220–230. By employing generic interfaces for interfaces 220–230, the designs for controllers 212, 214, and 218 are isolated from specific bus architectures and may be readily duplicated.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations. The cache controller logic may be reused without modification for cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Figure 3:
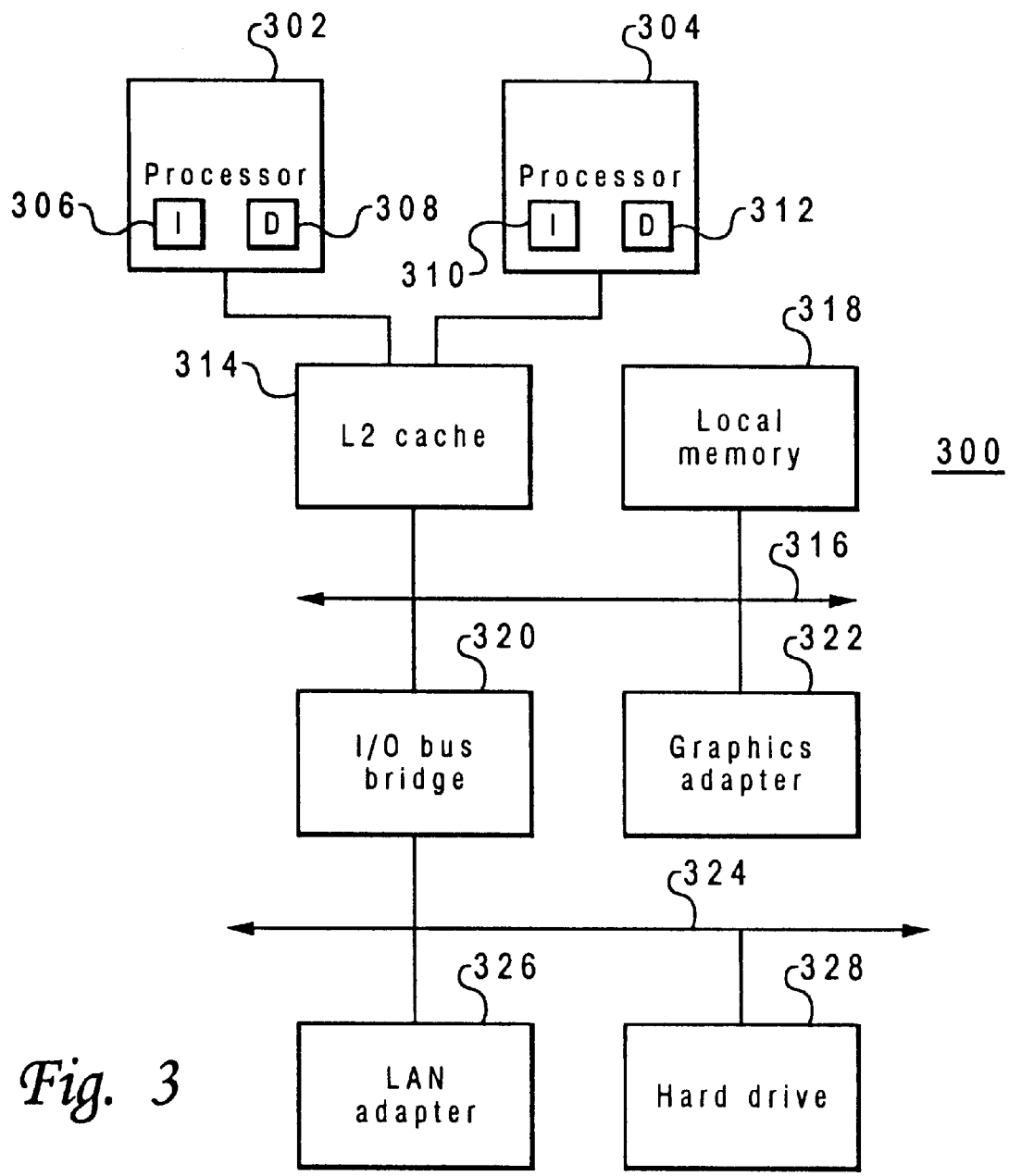
FIG. 3 depicts a data processing system implemented with a shared cache controller design in accordance with a preferred embodiment of the present invention.

With reference now to FIG. 3, a data processing system implemented with a shared cache controller design in accordance with a preferred embodiment of the present invention is depicted. Data processing system 300 includes a plurality of processors 302 and 304. Processor 302 in the depicted example includes separate internal level one (L1) instruction and data caches 306 and 308, respectively; similarly processor 304 includes separate L1 instruction and data caches 310 and 312, respectively.

Processors 302 and 304 are both connected to a single level two (L2) cache 314, which is a shared cache. L2 cache 314 is connected to system bus 316 for data processing system 300. Local memory 318 is also connected to system bus 316, as is I/O bus bridge 320 and memory-mapped graphics adapter 322. I/O bus bridge 320 is connected to I/O bus 324, which may be connected to a variety of other devices such as local area network (LAN) adapter 326 and hard disk drive 328.

As with FIG. 1, those skilled in the art will appreciate that the hardware depicted in FIG. 3 may vary, and that the depicted example is not intended to imply architectural imitations with respect to the present invention.

Figure 4:
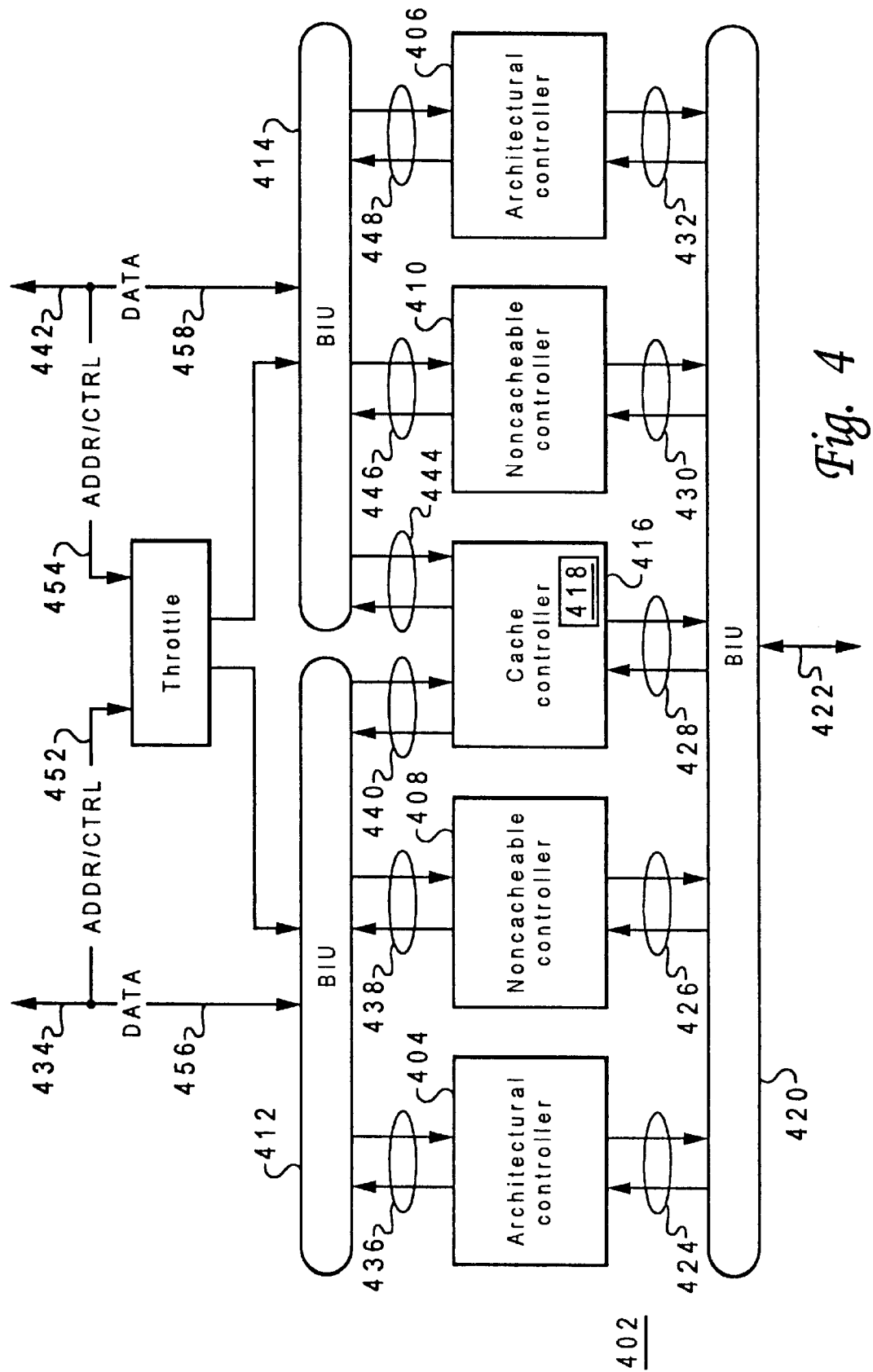
FIG. 4 is a block diagram of a shared cache controller design in accordance with a preferred embodiment of the present invention.

Referring to FIG. 4, a block diagram of a shared cache controller design in accordance with a preferred embodiment of the present invention. Controller 402 is formed from the same components comprising controller 202 depicted in FIG. 2, with architectural controller 214, noncacheable controller 218, and processor-side bus interface unit 204 being duplicated. Thus, controller 402 includes two architectural controllers 404 and 406, two noncacheable controllers 408 and 410, and two processor-side bus interface units 412 and 414. A single cache controller 416 has the exclusive ability to perform operations on cache 418.

A single system-side bus interface unit 420, connected to system bus 422, is connected to each of controllers 404–416 via generic interfaces 424–432. One processor-side bus interface unit 412, connected to a bus 434 to one processor (not shown), is connected to one architectural controller 404, one noncacheable controller 408, and cache controller 416 via generic interfaces 436–440, respectively. The other processor-side bus interface unit 414, connected to a second bus 442 to a second processor (not shown), is connected to the other architectural controller 406, the other noncacheable controller 410, and cache controller 416 via generic interfaces 444–448. Thus, cache controller 416 includes duplicate processor-side generic interfaces 440 and 444, each to a different processor-side bus interface unit 412 or 414.

Cache controller 416 requires more logic than cache controller 212 depicted in FIG. 2. However, the cache controller design is layered into functional units corresponding to specific operations to be handled. Each functional unit is substantially autonomous and handles one type of operation, such as a READ operation. Nominal interlocking between functional units is provided to prevent functional units from overlapping. Within a group of equivalent functional units for one type of operation, the interlocking logic determines which functional unit will handle a specific operation, preventing others from also performing the same operation. Thus, cache controller 416 includes the same functional units as were utilized in the design of cache controller 212 depicted in FIG. 2, but simply adds additional instances of given functional units.

Bus interface unit 420 requires more ports than the corresponding bus interface unit 208 depicted in FIG. 2. Again, the BIU design is layered into multiple, substantially autonomous units which may be easily replicated. Thus, additional ports may be easily implemented within bus interface unit 420.

In extending the nonshared controller design of FIG. 2 to the shared controller design of FIG. 4, a correspondence between ports in bus interface unit 420 and generic interfaces 424–432 is required. That is, while bus interface unit 408 depicted in FIG. 2 was only required to provide ports supporting three groups of interfaces 222, 226, and 230, bus interface unit 420 must provide ports supporting five groups of generic interfaces 424–432. This may be accomplished by either reducing the number of instances within the groups of generic interfaces to equal the number of ports available, or increasing the number of ports to equal the number of generic interfaces implemented. The option selected is a matter of design choice since layering of both the bus interface unit 420 and controllers 404, 406, 408, 410, and 416 makes both alternatives simple to execute.

Throttle unit 450 addresses the flow rate issues of extending a nonshared design to a shared design. Throttle unit 450 intercepts most of the address and control signals 452 and 454 forming buses 434 and 442, allowing the data portions 456 and 458 of those buses to pass directly to bus interface units 412 and 414. Throttle unit 450 stalls operations as necessary to prevent the overall flow rate of operations handled by cache controller 416 from exceeding the maximum supported flow rate. This allows the design of cache controller 212 to be reused in cache controller 416 with only relatively simple modifications.

Throttle unit 450 also serializes operations from the two processors. If two operations initiated by different processors temporally collide, such as when both are initiated in the same cycle, throttle unit 450 delays one operation while the other proceeds. Operations initiated by processors attached to buses 434 and 442 are thus serialized and delayed to the extent required by controller 402. Therefore, the fundamental design of cache controller 212 depicted in FIG. 2 may be reused in cache controller 416 despite a probable increase in operation flow rate. Operations are stalled when necessary to reduce the flow rate to and acceptable level for cache controller 416.

Several well known techniques for deciding which operation to stall may be employed by throttle unit 450. For example, throttle unit 450 may simply select one of buses 434 and 442 to always lose when operations are initiated on both buses simultaneously. Alternatively, throttle unit 450 may employ some dynamic mechanism to vary which bus 434 of 442 loses for a particular collision, such as pseudo-random or round robin selection. These and other approaches are well known to those skilled in the art.

The present invention is limited by the requirement that the bus protocol for buses 434 and 442 tolerate being stalled. Not all bus protocols support such an option. However, most bus protocols of interest, including the 60X bus, support the ability to stall operations because frequently bus participants have varying performance levels.

Although depicted as implemented within a level two cache shared by two processors in FIG. 4, the invention described is equally applicable to equivalent configurations, such as a level three cache shared by two L2 caches. The exemplary embodiment employed to describe the present invention is not meant to imply limitations on implementation.

Figure 5:
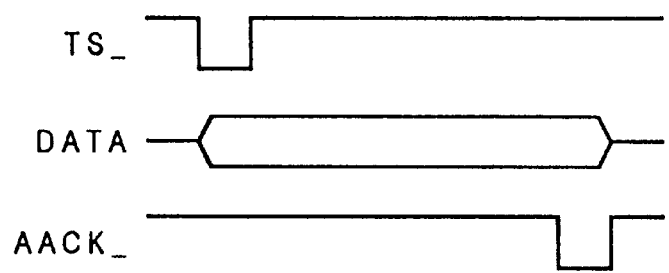
FIG. 5 depicts a timing diagram for a stalling mechanism which may be employed by a shared cache controller in accordance with a preferred embodiment of the present invention.
Figure 7:
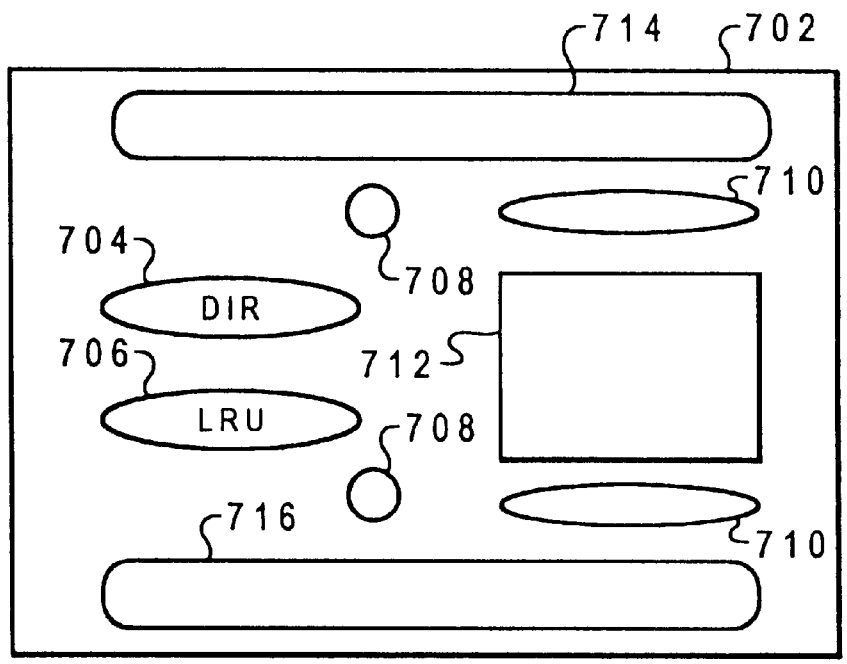
FIG. 7 depicts a prior art cache controller design.

With reference to FIG. 5, a timing diagram for a stalling mechanism which may be employed by a shared cache controller in accordance with a preferred embodiment of the present invention is depicted. The example depicted is derived from the 60X bus protocol. A initiation signal (TS__) driven by the processor indicates the beginning of an operation. A responsive acknowledgement signal (AACK__) driven by the L2 cache indicates that the initiation signal has been detected and is no longer required. Throttling in the depicted example may be achieved by simply delaying assertion of this responsive (AACK__) signal.

Under prior art designs, management of interactions between architectural operations and cache operations make implementing shared cache controllers extremely complicated. Implementing a shared cache controller for the prior art approach typically requires associative comparators, queue comparators, and other architectural management functions to avoid collisions, tremendously increasing the design complexity.

The layered controller of the present invention, however, scales for additional processors. Referring again to FIG. 4, the actual cache 418 is only influenced by the generic interfaces 440, 444, and 428 to cache controller 416. Separate architectural controllers, noncacheable controllers, and processor-side bus interface units are required for each processor sharing cache 418, but additional processors may be supported by the cache controller—and therefore by a single shared cache—by simply adding another instance of the generic interfaces 440 and 444, and appropriately modifying throttle unit 450. The bus interface units, designed to support multiple instances of the generic interfaces, are easily expandable and need not be functionally altered beyond duplication of functional units within a BIU to provide the required resources. Replication of the noncacheable controller, which only handles cache operations, is actually optional. Besides implementing additional instances of functional units, the only further change to cache controller 416 which might be required over the design of cache controller 212 depicted in FIG. 2 is to increase the size of cache 418. A cache size suitable for nonshared implementation may not be suitable for a shared cache. Changing cache size is a fairly straightforward issue not comparable to implementing additional interlock logic.

Figure 6:
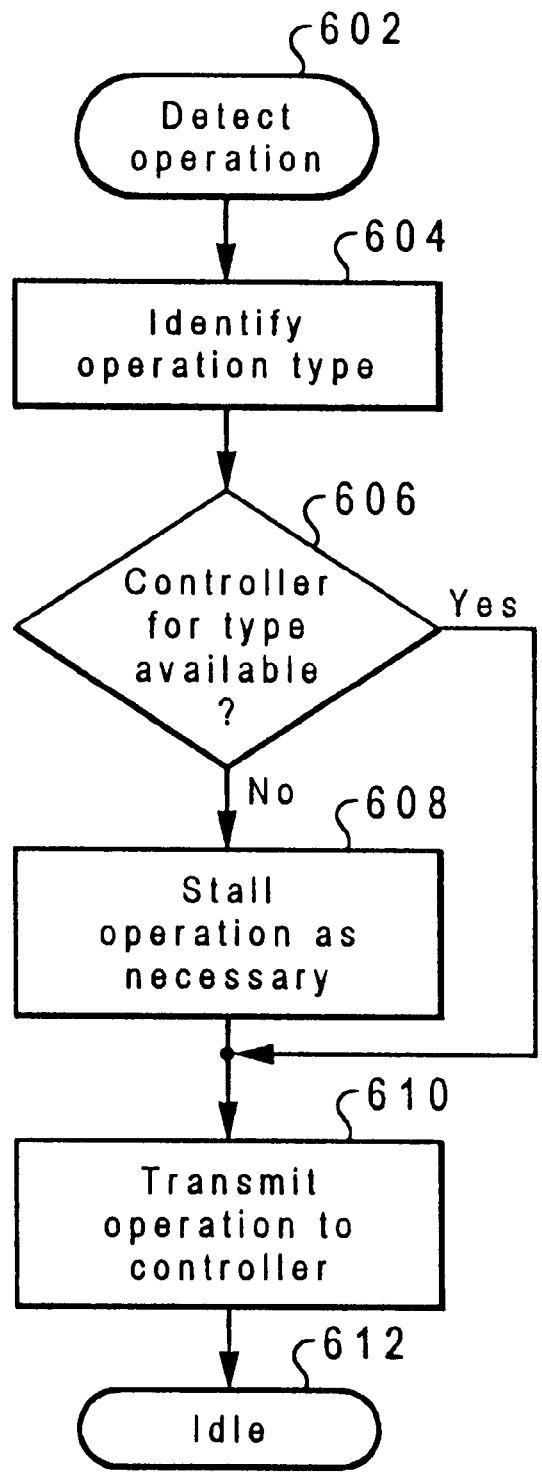
FIG. 6 is a high level flowchart for a process of managing operations in a shared cache controller in accordance with a preferred embodiment of the present invention.

Referring to FIG. 6, a high level flowchart for a process of managing operations in a shared cache controller in accordance with a preferred embodiment of the present invention is illustrated. The process begins as step 602, which depicts detection of an operation to be performed. The process next passes to step 604, which illustrates identifying the type of the operation to determine which controller—cache, noncacheable, or architectural—should handle the operation.

The process next passes to step 606, which depicts a determination of whether the appropriate controller is available to handle the operation. If so, the process proceeds directly to step 610, depicted below. If not, the process proceeds to step 608, which illustrates stalling the operation as necessary, until the appropriate controller becomes available. The process then passes to step 610, which depicts passing the operation to the appropriate controller, and then to step 612, which depicts the process becoming idle until another operation is detected. Those skilled in the art will appreciate that the process depicted is simplified for the purposes of explanation.

Stalling operations as described above has obvious impact on overall performance. Such performance trade-offs are acceptable, however, in view of the ease within which a controller design may be extended from nonshared to shared. Design extension may be particularly important due to short product life cycles.

The present invention facilitates extension of a nonshared cache controller design to a shared cache controller design by layering cache and architectural specific functions. Because cache operations are isolated from the variable timing associated with architectural operations, one cache operation within a colliding pair of cache operations may be briefly delayed to serialize the operations and regulate the operation flow rate. This allows a cache controller design for a nonshared cache to be reused in a shared cache controller with only straightforward modifications.

While the invention has been particularly shown and described with reference to a preferred embodiment, it will be understood by those skilled in the art that various changes in form and detail may be made therein without departing from the spirit and scope of the invention.

What is claimed is:

1. A method of managing operations in a shared cache controller, comprising:

receiving operations for a storage unit within a storage hierarchy from a first processor at a first bus interface unit and from a second processor at a second bus interface unit;

for each operation received, identifying a controller unit within a plurality of controller units to which the operation should be passed, wherein the plurality of controller units includes:

a cache controller unit for cache operations received at the first and second bus interface units for the storage unit;

a first architectural controller unit for architectural operations received at the first bus interface unit for the storage unit; and a second architectural controller unit for architectural operations received at the second bus interface unit for the storage unit;

responsive to detecting a collision between a plurality of cache operations initiated by the first and second processors, selecting a cache operation within the plurality of cache operations; and stalling the selected cache operation until completion of another cache operation within the plurality of cache operations, wherein cache operations for the storage unit from the first and second processors are serialized.

2. The method of claim 1, further comprising:

detecting collision of a cache operation from the first processor with a cache operation from the second processor from addresses associated with the cache operations from the first and second processors.

3. The method of claim 1, wherein the step of selecting a cache operation within the plurality of cache operations further comprises:

always selecting a cache operation from the first processor.

4. The method of claim 1, wherein the step of selecting a cache operation within the plurality of cache operations further comprises:

randomly selecting a cache operation from the first or second processor.

5. The method of claim 1, wherein the step of selecting a cache operation within the plurality of cache operations further comprises:

selecting a cache operation from the first and second processors in round-robin fashion.

6. The method of claim 1, wherein the step of stalling the selected cache operation until completion of another cache operation within the plurality of cache operations further comprises:

delaying assertion of a signal responsive to a signal initiating the selected cache operation.

7. The method of claim 1, further comprising:

receiving operations for the storage unit from a system bus at a third bus interface unit connected to the cache controller unit, the first architectural controller unit, and the second architectural controller unit.

8. The method of claim 1, further comprising:

performing cache operations on noncacheable memory addresses received from the first processor for the storage unit in a first noncacheable controller unit connected to the first bus interface unit; and performing cache operations on noncacheable memory addresses received from the second processor for the storage unit in a second noncacheable controller unit connected to the second bus interface unit.

9. The method of claim 1, further comprising:

performing cache operations on cacheable memory addresses received from the first and second processors for the storage unit in the cache controller unit.

10. The method of claim 1, further comprising:

performing architectural operations received from the first processor for the storage unit in the first architectural controller unit; and performing architectural operations received from the second processor for the storage unit in the second architectural controller unit.

11. A shared cache controller, comprising:

a first bus interface unit receiving operations for a storage unit within a storage hierarchy from a first processor;

a second bus interface unit receiving operations for the storage unit from a second processor;

a plurality of controller units including:

a cache controller unit connected to the first and second bus interface units performing cache operations from the first and second processors for the storage unit;

a first architectural controller unit connected to the first bus interface unit performing at least a portion of architectural operations from the first processor for the storage unit; and a second architectural controller unit connected to the second bus interface unit performing at least a portion of architectural operations from the second processor for the storage unit; and a throttle unit connected between the first and second processors and the storage unit, the throttle unit serializing a plurality of colliding cache operations from the first and second processors for the storage unit.

12. The shared cache controller of claim 11, wherein the throttle unit serializes the plurality of colliding cache operations by stalling at least one cache operation within the plurality of colliding cache operations until another cache operation within the plurality of colliding cache operations is completed.

13. The shared cache controller of claim 11, wherein the throttle unit is connected to address and control signal conductors from the first processor and to address and control signal conductors from the second processor.

14. The shared cache controller of claim 11, further comprising:

address and control signal conductors connecting the first processor to the throttle unit;

address and control signal conductors connecting the throttle unit to the first bus interface unit; and data signal conductors connecting the first processor and the first bus interface unit.

15. The shared cache controller of claim 11, wherein the throttle unit, upon detecting collision of the plurality of colliding cache operations from the first and second processors, stalls a cache operation from the first processor.

16. The shared cache controller of claim 11, wherein the throttle unit, upon detecting collision of the plurality of colliding cache operations from the first and second processors, randomly selects a cache operation to stall.

17. The shared cache controller of claim 11, wherein the throttle unit, upon detecting collision of the plurality of colliding cache operations from the first and second processors, stalls a cache operations from the first processor if a cache operation from the second processor was previously stalled upon detection of a plurality of colliding cache operations from the first and second processors.

18. The shared cache controller of claim 11, further comprising:

a third bus interface unit connected to the cache controller unit, the first architectural controller unit, and the second architectural controller unit and receiving operations for the storage unit from a system bus.

19. The shared cache controller of claim 11, further comprising:

a first noncacheable controller unit connected to the first bus interface unit performing cache operations on noncacheable memory addresses received from the first processor; and a second noncacheable controller unit connected to the second bus interface unit performing cache operations on noncacheable memory addresses received from the second processor.

20. A controlling system for a storage unit within a storage hierarchy shared by first and second processors, comprising:

a first bus interface unit receiving operations for the storage unit from the first processor;

a second bus interface unit receiving operations for the storage unit from the second processor;

a cache controller unit connected to the first and second bus interface units and performing each cache operation from the first and second processors for the storage unit;

a first architectural controller unit connected to the first bus interface unit and performing at least a portion of each architectural operation from the first processor for the storage unit;

a second architectural controller unit connected to the second bus interface unit and performing at least a portion of each architectural operations from the second processor for the storage unit; and a throttle unit connected between the first processor and the first bus interface unit and between the second processor and the second bus interface unit, the throttle unit serializing a plurality of colliding cache operations from the first and second processors for the storage unit by stalling at least one cache operation within the plurality of colliding cache operations until another cache operation within the plurality of colliding cache operations is completed.

21. The controlling system of claim 20, further comprising:

address and control signal conductors connecting the first processor to the first bus interface unit through the throttle unit and connecting the second processor to the second bus interface unit through the throttle unit;

data signal conductors directly connecting the first processor and the first bus interface unit and directly connecting the second processor and the second bus interface unit.

* * * * *